(12) United States Patent
Lee et al.

(10) Patent No.: US 10,618,844 B2
(45) Date of Patent: Apr. 14, 2020

(54) VERMICULITE CORE FOR VEHICLE AND METHOD FOR MANUFACTURING THEREOF

(71) Applicant: Hyundai Motor Company, Seoul (KR)

(72) Inventors: Yoon-Ki Lee, Seoul (KR); Min-Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 15/364,663

(22) Filed: Nov. 30, 2016

(65) Prior Publication Data

US 2017/0369378 A1 Dec. 28, 2017

(30) Foreign Application Priority Data

Jun. 28, 2016 (KR) .......................... 10-2016-0080533

(51) Int. Cl.
| | | |
|---|---|---|
| *B32B 7/02* | (2019.01) | |
| *C04B 33/04* | (2006.01) | |
| *B22C 9/10* | (2006.01) | |
| *B22C 1/00* | (2006.01) | |
| *B22D 19/04* | (2006.01) | |
| *C04B 33/13* | (2006.01) | |
| *C04B 33/20* | (2006.01) | |

(52) U.S. Cl.
CPC ............... *C04B 33/04* (2013.01); *B22C 1/00* (2013.01); *B22C 9/10* (2013.01); *B22D 19/04* (2013.01); *C04B 33/131* (2013.01); *C04B 33/20* (2013.01); *C04B 2235/349* (2013.01); *C04B 2235/442* (2013.01); *C04B 2235/77* (2013.01); *C04B 2235/945* (2013.01)

(58) Field of Classification Search
CPC ........ C04B 2235/349; C04B 2235/442; C04B 2235/77; C04B 2235/945; C04B 33/04; C04B 33/131
See application file for complete search history.

(56) References Cited

U.S. PATENT DOCUMENTS

| | | |
|---|---|---|
| 6,863,113 B2 | 3/2005 | Ei-Demallawy et al. |
| 2011/0025009 A1 | 2/2011 | Neumann et al. |

FOREIGN PATENT DOCUMENTS

| | | |
|---|---|---|
| DE | 10 2008 034 593 A1 | 1/2010 |
| EP | 1 457 358 B1 | 4/2005 |
| EP | 2 014 391 A2 | 1/2009 |
| KR | 10-2015-0108639 A | 9/2015 |
| KR | 1020160061507 | 7/2016 |
| WO | WO/1993/021126 | 10/1993 |
| WO | WO 97/30951 | 8/1997 |

OTHER PUBLICATIONS https://encyclopedia2.thefreedictionary.com/pearlstone, 2003.*
Hoffmann, EP1457358 translation, Apr. 27, 2005.*
"Vermiculite," *Wikipida*, 10:1-7 (2018).

* cited by examiner

*Primary Examiner* — Lawrence D Ferguson
(74) *Attorney, Agent, or Firm* — Morgan, Lewis & Bockius LLP

(57) ABSTRACT

A vermiculite core for a vehicle may include vermiculite and pearlstone, an aluminum component for the vehicle may be manufactured using the vermiculite core including the vermiculite and the pearlstone, and a method for manufacturing the vermiculite core for the vehicle may include mixing the vermiculite and the pearlstone, injecting a mixture of the vermiculite and the pearlstone into a mold, and pressing the mixture using a presser.

13 Claims, 11 Drawing Sheets

(PRIOR ART)
FIG. 1A    FIG. 1B    FIG. 1C    FIG. 1D
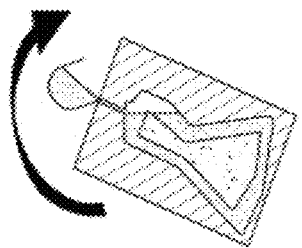
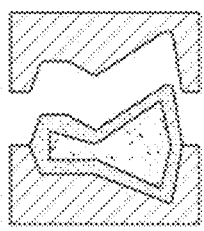
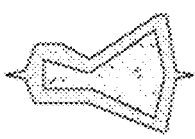
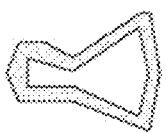
FIG. 2(PRIOR ART)
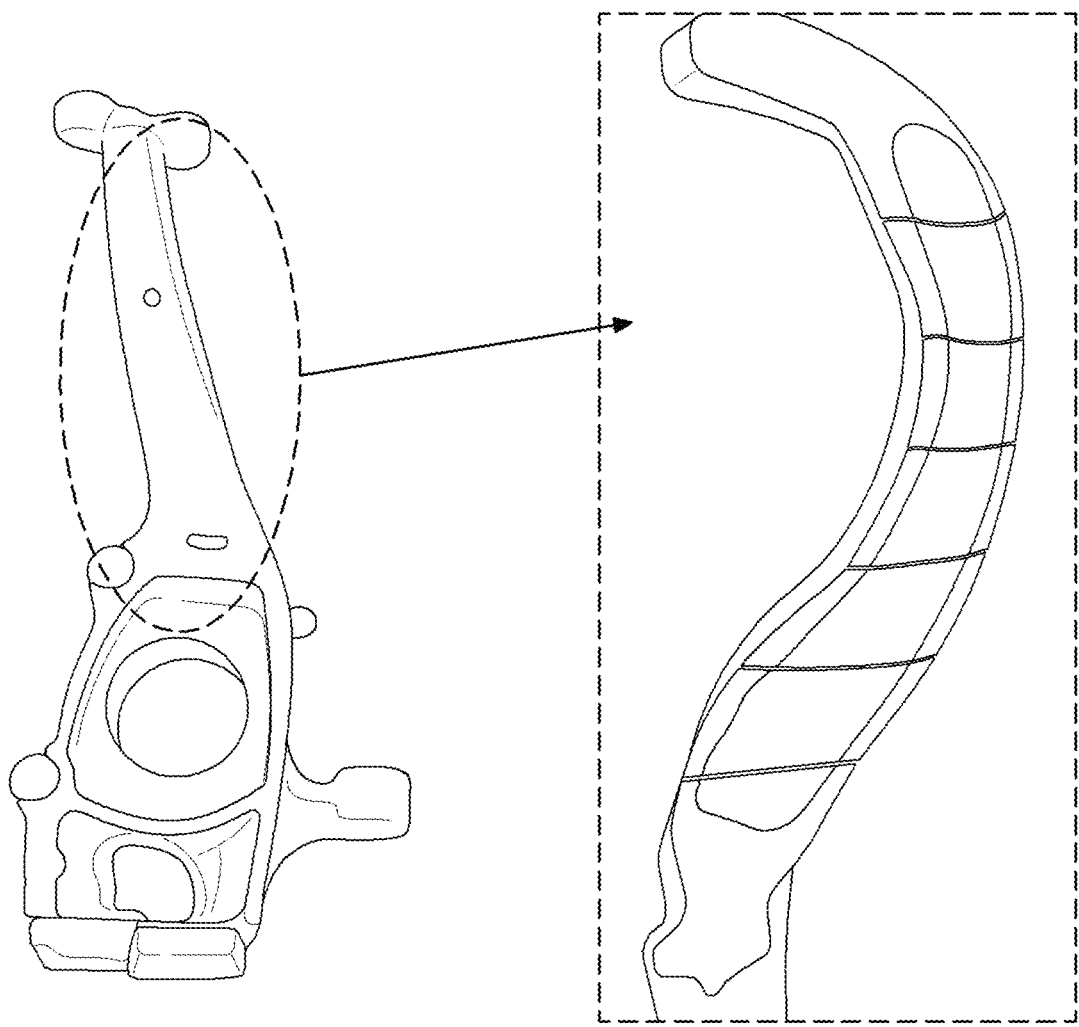

FIG. 5A
FIG. 5B
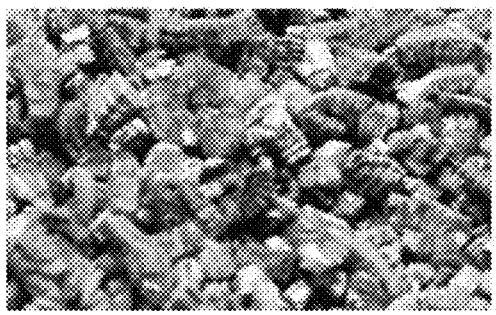
FIG. 6
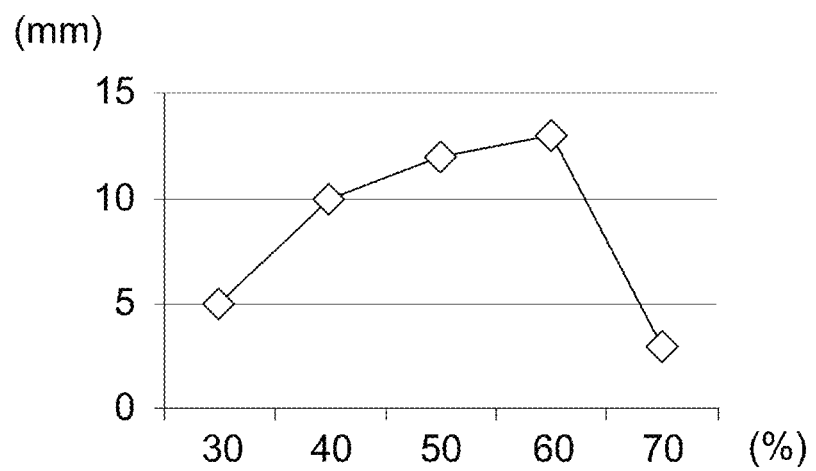

FIG. 9
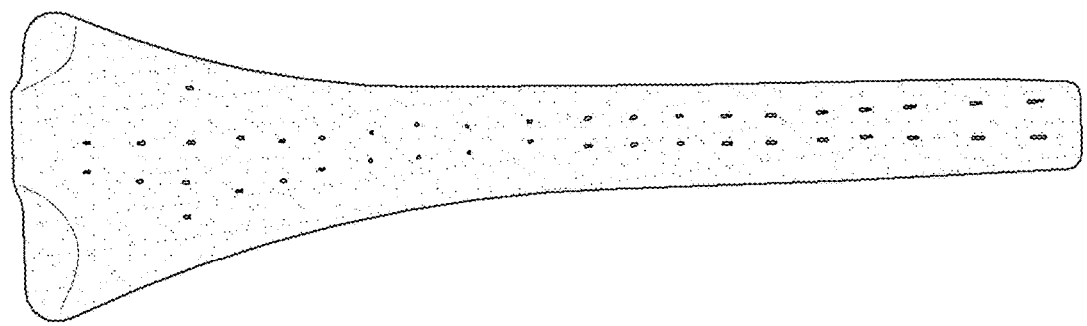
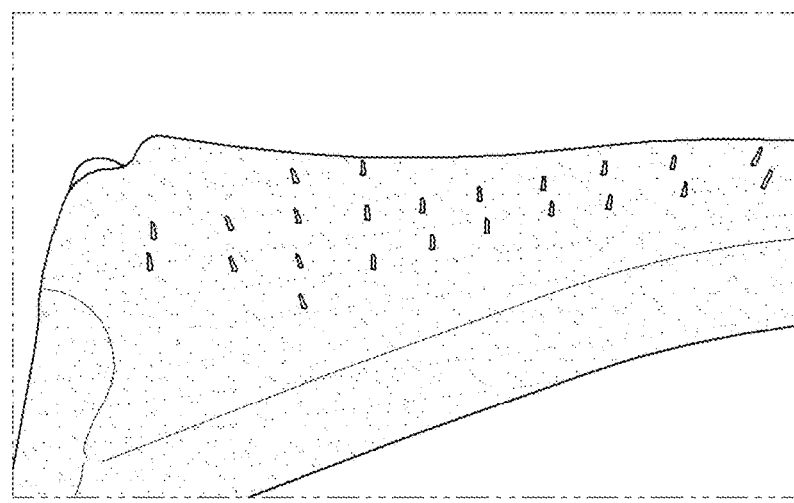
FIG. 10A     FIG. 10B     FIG. 10C     FIG. 10D
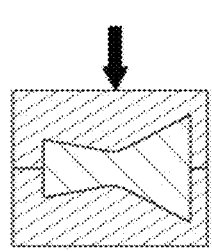 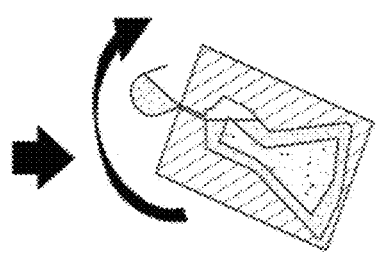 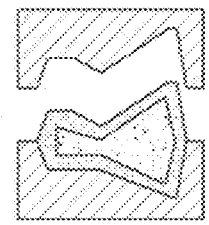 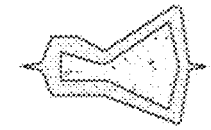

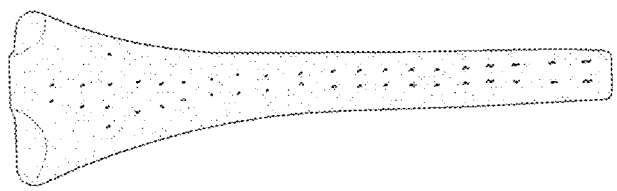 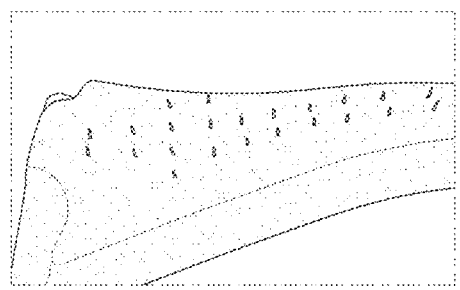
FIG. 15A
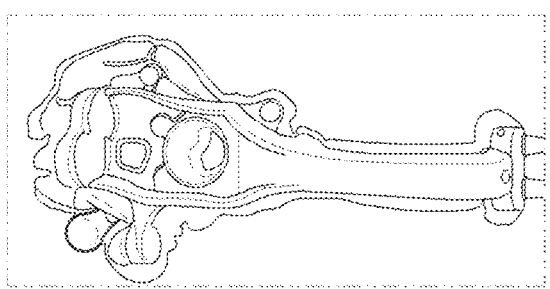 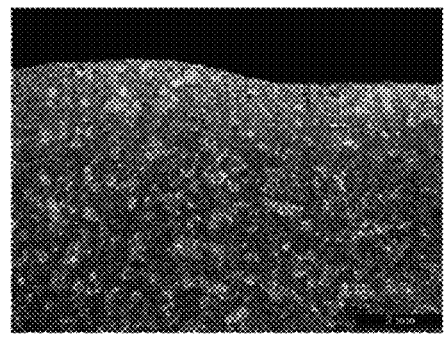
FIG. 15B  FIG. 15C

VERMICULITE CORE FOR VEHICLE AND METHOD FOR MANUFACTURING THEREOF

CROSS-REFERENCE TO RELATED APPLICATIONS

The present application claims priority to Korean Patent Application No. 10-2016-0080533, filed Jun. 28, 2016, the entire contents of which is incorporated herein for all purposes by this reference.

BACKGROUND OF THE INVENTION

Field of the Invention

The present invention relates to a vermiculite core for a vehicle and a method for manufacturing the same, and more particularly, to a vermiculite core for a vehicle which includes foam vermiculite and pearlstone and optimizes the density and the ratio thereof, an aluminum component for a vehicle manufactured by using the same, and a method for manufacturing the vermiculite core for the vehicle.

Description of Related Art

In general, vermiculite which is widely used as construction materials in the related art has many small spaces formed when a vermiculite material is expanded 5 to 12 times at a high temperature of 800° C. to 1100° C. The density of the vermiculite is 0.1 to 0.25 g/cm$^3$, but the vermiculite is frequently used by mixing pearlstone having the density of 0.06 to 0.18 g/cm$^3$, and is pressed for a purpose of having various pressing ratios.

Currently, the expanded vermiculite is widely used in the architectural field, but is still at a developmental stage in the vehicle component field. The vermiculite has a stable shape even at 1100° C. or more, and even though the vermiculite is coupled with a binder to be pressed, the specific gravity thereof is just 0.6 g/cm$^3$, and thus it is expected that the vermiculite is inserted to an aluminum casting component for a vehicle to have various application methods as a low-specific gravity core.

Currently, in the case of a casting and forging process used in a knuckle or a carrier for a vehicle, there are advantages of enhancing the surface strength through the forging process and removing harmful cracks or grooves which may be generated during casting. On the other hand, in the case of inserting the vermiculite core, there is a problem in that the strength of the vermiculite is not sufficiently ensured during forging and thus the forging rate is deteriorated.

Meanwhile, the related art is largely divided into a casting and forging process of a solid core specification which performs forging after casting and a hollow specification which performs casting using a threaded core without a forging process. In the related art, some salt cores for forging and the like have been developed. However, since the salt cores are not a complete close type by requiring an outlet for extracting the core, fatigue strength is disadvantageous and a peripheral corrosion problem caused by the salt occurs, and thus it is difficult to completely control the process.

Accordingly, by solving the problem, development for a vermiculite core for a vehicle which is endurable even in forging by ensuring sufficient forging and a manufacturing method thereof is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vermiculite core for a vehicle, an aluminum component for a vehicle manufactured by using the same, and a method for manufacturing the vermiculite core for the vehicle, in which the weight can be reduced to be similar to the hollow structure, extraction of the core is not separately required to have a high design freedom, and there is no deterioration of fatigue strength caused by the outlet.

Additionally, various aspects of the present invention are directed to providing a vermiculite core for a vehicle, an aluminum component for a vehicle manufactured by using the same, and a method for manufacturing the vermiculite core for the vehicle, in which the strength is ensured during forging and the forging rate is enhanced by applying the aluminum bridge or the steel pin to the vermiculite core, and the extraction of the core is not required and thus, processing cost is reduced.

According to various aspects of the present invention, a vermiculite core for a vehicle may include vermiculite and pearlstone.

A density of the vermiculite may range from 0.1 to 0.25 g/cm$^3$.

A density of the pearlstone may range from 0.06 to 0.18 g/cm$^3$. A content of the vermiculite may range from 40 to 60% with respect to an entire volume of the vermiculite core for the vehicle.

The vermiculite core for the vehicle may be formed by pressing a mixture of the vermiculite and the pearlstone.

A density of the pressed mixture may range from 0.4 to 0.8 g/cm$^3$.

The vermiculite core for the vehicle may be formed divided into a plurality of specimens horizontally in a forging direction.

The vermiculite core for the vehicle may be formed to insert a plurality of steel pins horizontally in a forging direction.

According to various aspects of the present invention, an aluminum component for a vehicle may be manufactured using a vermiculite core for a vehicle, the vermiculite core including vermiculite and pearlstone.

According to various aspects of the present invention, a method for manufacturing a vermiculite core for a vehicle may include mixing vermiculite and pearlstone, injecting a mixture of the vermiculite and the pearlstone into a mold, and pressing the mixture using a presser.

In the injecting, the mixture may be divided and injected to form an aluminum bridge horizontally in a forging direction.

In the injecting, the mixture may be injected to insert a plurality of steel pins horizontally in a forging direction.

According to the vermiculite core for the vehicle, the aluminum component for the vehicle manufactured using the same, and the method for manufacturing the vermiculite core for the vehicle of the present invention, i) the weight can be reduced to be similar to the hollow structure, ii) extraction of the core is not separately required to have a high design freedom, iii) there is no deterioration of fatigue strength caused by the outlet. Furthermore, iv) the strength is ensured during forging and the forging rate is enhanced by applying the aluminum bridge or the steel pin to the vermiculite core, and v) the extraction of the core is not required and thus, processing cost may be reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A, FIG. 1B, FIG. 1C, and FIG. 1D are diagrams illustrating a process of manufacturing a component for a vehicle using a threaded core or a salt core according to a related art.

FIG. 2 is a photograph illustrating a component for a vehicle according to the related art.

FIG. 5A and FIG. 5B are enlarged photographs illustrating vermiculite and pearlstone.

FIG. 6 is a graph illustrating a change in flash length according to a ratio of pearlstone in the vermiculite core for the vehicle.

FIG. 9 is an enlarged photograph illustrating the vermiculite core for the vehicle having the steel pin structure according to various embodiments of the present invention.

FIG. 10A, FIG. 10B, FIG. 10C, and FIG. 10D are exemplary diagrams illustrating a process of manufacturing an aluminum component for a vehicle using a vermiculite core according to various embodiments of the present invention.

FIG. 14A, FIG. 4B, and FIG. 14C are photographs illustrating a forged flash length and a surface state of the aluminum component for the vehicle before applying the steel pin according to various embodiments of the present invention.

FIG. 15A, FIG. 15B, and FIG. 15C are photographs illustrating a forged flash length and a surface state of the aluminum component for the vehicle after applying the steel pin according to various embodiments of the present invention.

Figure 3A:
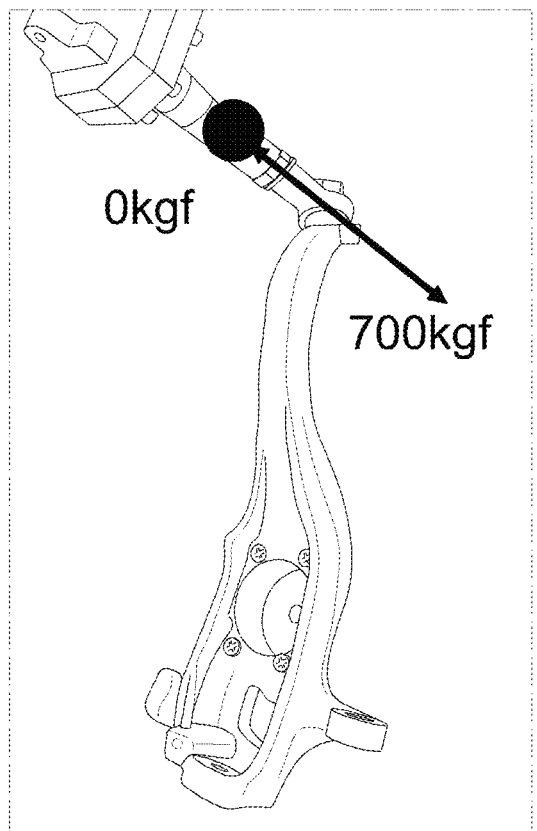
FIG. 3A and FIG. 3B are photographs illustrating a pot hole durability test of the component for the vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Vermiculite which is widely used as construction materials in the related art has many small spaces formed when a vermiculite material is expanded 5 to 12 times at a high temperature of 800° C. to 1100° C. The density of the vermiculite is 0.1 to 0.25 g/cm$^3$, but the vermiculite is frequently used by mixing pearlstone having the density of 0.06 to 0.18 g/cm$^3$, and is pressed for the purpose of having various pressing ratios.

Currently, in the case of a casting and forging process used in a knuckle or a carrier for a vehicle, there are advantages of enhancing the surface strength through the forging process and removing harmful cracks or grooves which may be generated during casting. On the other hand, in the case of inserting the vermiculite core, there is a problem in that the strength of the vermiculite is not sufficiently ensured during forging and thus the forging rate is deteriorated.

Meanwhile, the related art is largely divided into a casting and forging process of a solid core specification which performs forging after casting and a hollow specification which performs casting using a threaded core without a forging process and some salt cores for forging and the like have been developed. However, since the salt cores are not a complete close type by requiring an outlet for extracting the core, fatigue strength is disadvantageous and a peripheral corrosion problem caused by the salt occurs, and thus it is difficult to completely control the process.

Accordingly, by solving the problem, development for a vermiculite core for a vehicle which is endurable even in forging by ensuring sufficient forging and a manufacturing method thereof is required.

FIGS. 1A-1D are diagrams illustrating a process of manufacturing a knuckle for a vehicle using a threaded core or a salt core according to the related art. First, the process is performed in order of an insert casting process by applying the core (see FIG. 1A), a forging process (see FIG. 1B), and trimming (see FIG. 3C), and then shot blasting the core. A component for a vehicle illustrated in FIG. 2 may be manufactured through such as process.

Figure 3B:
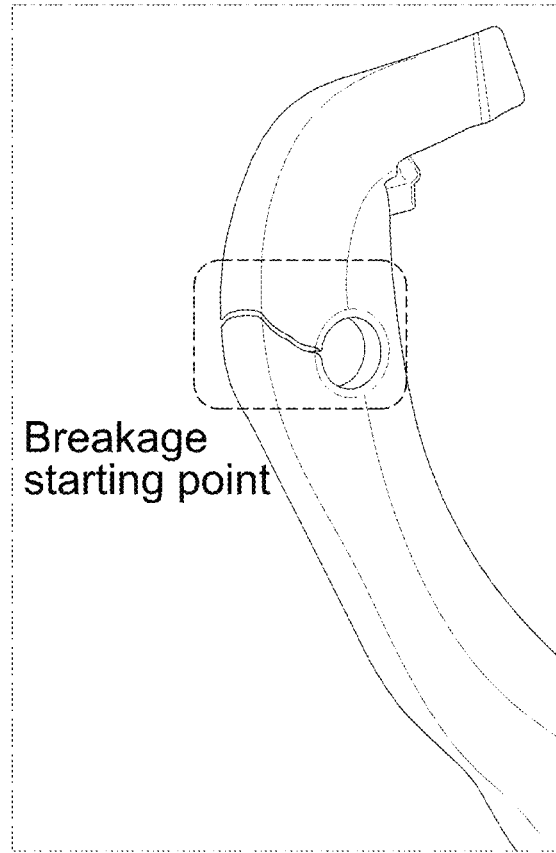

However, in the case of the component for the vehicle manufactured through such as process, as illustrated in FIG. 3, as a result of performing a durability test in an environment of 700 kgf (see FIG. 3A), there is a problem in that fatigue strength is to be adverse around the core outlet as a breakage starting point (see FIG. 3B).

Accordingly, development of a vermiculite core for a vehicle which is durable even in forging by ensuring sufficient forging and a manufacturing method thereof is required.

The vermiculite core for the vehicle of various embodiments of the present invention includes foam vermiculite and pearlstone.

Figure 4:
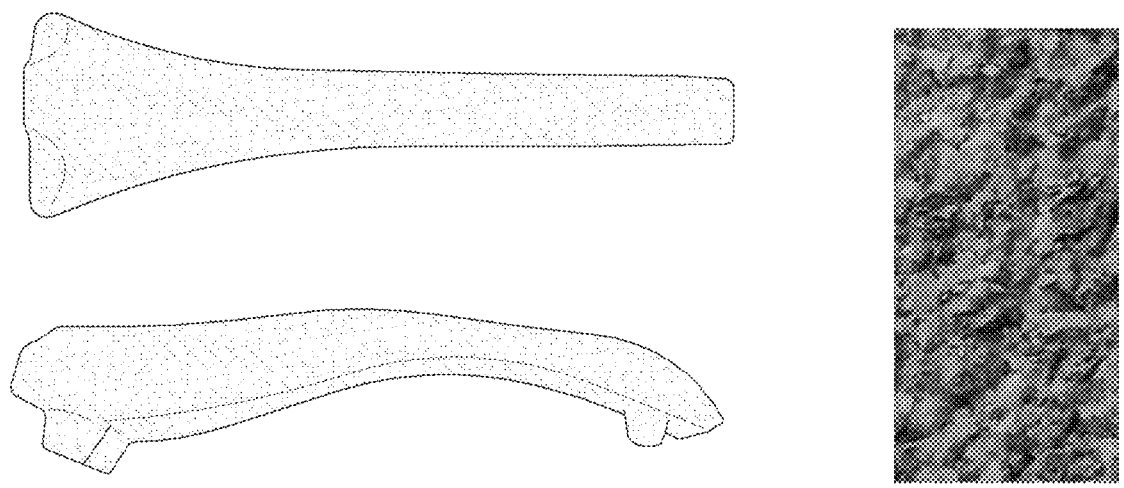
FIG. 4 is a photograph and an enlarged photograph illustrating a cross section of a vermiculite core for a vehicle according to various embodiments of the present invention.

FIG. 4 is a photograph of a vermiculite core for a vehicle and an enlarged photograph illustrating a cross section thereof according to various embodiments of the present invention.

In various embodiments, the density of the vermiculite ranges from 0.1 to 0.25 $g/cm^3$ and the density of the pearlstone ranges from 0.06 to 0.18 $g/cm^3$.

According to various embodiments of the present invention, the content of the vermiculite is preferably 40 to 60% with respect to the entire volume of the vermiculite core for the vehicle.

The vermiculite and the pearlstone have heat resistance as an architectural material and have a similar characteristic of expanding about 20 times during heating. In the architectural materials used through only pressing, ratios are variously adjusted according to each use and cost. However, a high-pressure forging process is performed again after pressing using a presser when being applied to the component for the vehicle, and in order to be endurable in the environment, the ratio of vermiculite and pearlstone acts as an important factor.

FIGS. 5A and 5B are enlarged photographs illustrating vermiculite and pearlstone. As illustrated in FIG. 5A, the vermiculite is swollen into an accordion shape to be pressed when high pressure is applied due to elasticity. However, as illustrated in FIG. 5B, the pearlstone is made of hard pearlstone and thus the shape is not changed at some degree of pressure, but the pearlstone is pressed or broken when high pressure is applied. Accordingly, in order to withstand the high-pressure forging process, an appropriate ratio of vermiculite and pearlstone is important.

FIG. 6 is a graph illustrating a change in flash length according to a ratio of pearlstone in the vermiculite core for the vehicle. As illustrated in FIG. 6, in the early stages, as the content of the pearlstone is increased, the forging rate is gradually increased, but when the content of the pearlstone is 60% or more, the forging rate is rapidly decreased. Accordingly, when the content of the vermiculite is 40 to 60% with respect to the entire volume of the vermiculite core, a forged flash of 10 mm or more is formed to ensure a preferable property as the vermiculite core for the vehicle. As described below, even in the case of applying a steel pin, the forged flash of 30 mm or more may be formed to ensure an appropriate forging rate.

According to various embodiments of the present invention, the vermiculite core for the vehicle may be formed by pressing a mixture of the foam vermiculite and the pearlstone.

In various embodiments of the present invention, the density of the pressed mixture ranges from 0.4 to 0.8 $g/cm^3$.

In accordance with various embodiments of the present invention, the vermiculite core for the vehicle is formed to be divided into a plurality of specimens horizontally in a forging direction.

Figure 7:
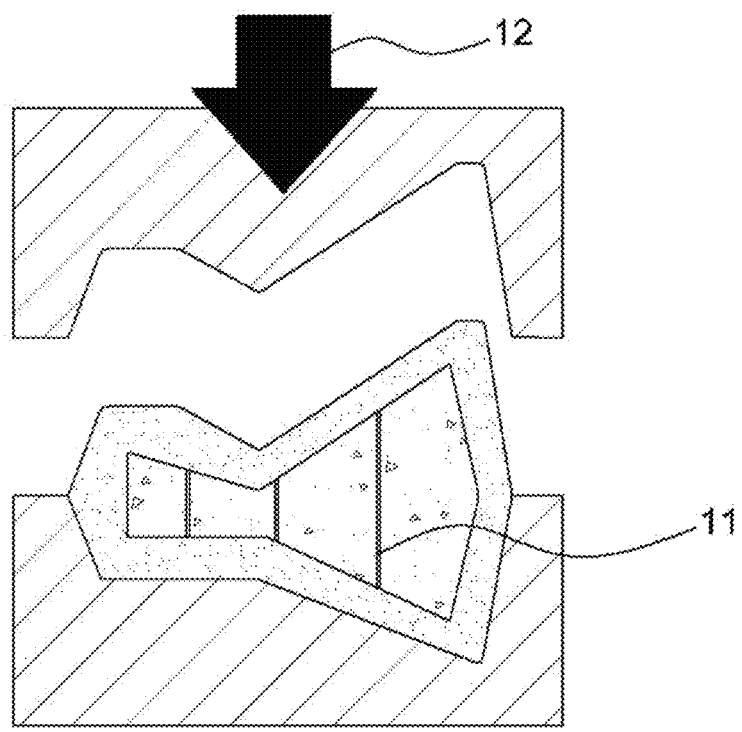
FIG. 7 is an exemplary diagram illustrating a vermiculite core for a vehicle having an aluminum bridge structure according to various embodiments of the present invention.

FIG. 7 is an exemplary diagram illustrating a vermiculite core for a vehicle having an aluminum bridge structure according to various embodiments of the present invention.

In various embodiments of the present invention, in order to enhance the strength of the vermiculite core which is endurable to the forging, a method of forming an aluminum bridge by dividing the core during casting is contrived and as illustrated in FIG. 7, a bridge is designed horizontally in a forging direction to correspond to the forging direction. The method of preparing the bridge may largely include two types of i) a method of forming the bridge in a well shape by dividing and casting the vermiculite core and ii) a method of forming the aluminum bridge in a column shape by drilling a hole in the vermiculite core to fill a molten metal in the hole.

According to various embodiments of the present invention, the vermiculite core for the vehicle is formed to be inserted into a plurality of steel pins horizontally in the forging direction.

Figure 8:
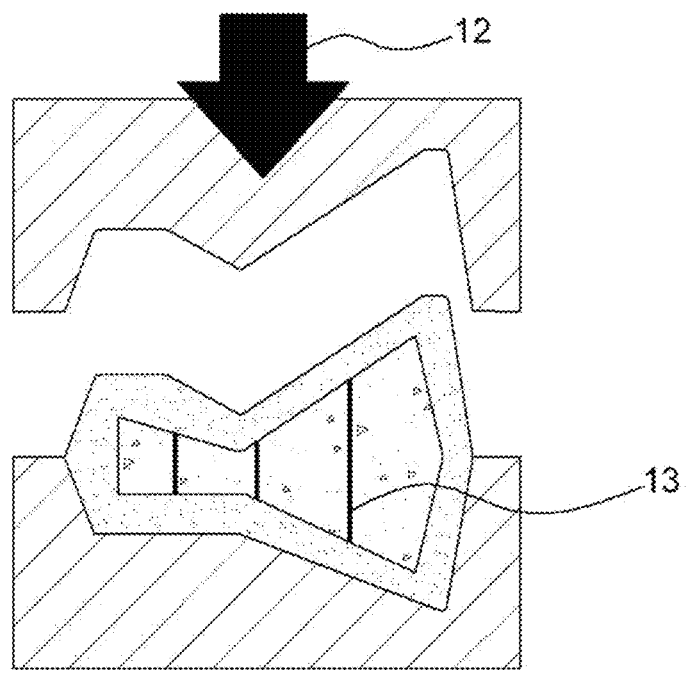
FIG. 8 is an exemplary diagram illustrating a vermiculite core for a vehicle having a steel pin structure according to various embodiments of the present invention.

FIG. 8 is an exemplary diagram illustrating a vermiculite core for a vehicle having a steel pin structure according to various embodiments of the present invention and FIG. 9 is an enlarged photograph illustrating the vermiculite core for the vehicle having the steel pin structure according to various embodiments of the present invention.

For a flow of the molten metal due to the characteristic of the aluminum bridge prepared through low-pressure casting, the thickness and the width may be 4 mm or more, and in actual casting environment, generally, the thickness and the width are increased. Accordingly, in order to minimize an increase in weight due to the bridge, thin pins made of steel are applied to the entire forged surface to reduce the weight of the bridge. Simultaneously, on the forged surface, a strength enhanced effect may be entirely obtained.

Meanwhile, various embodiments of the present invention for solving the problems in the related art provide an aluminum component for a vehicle manufactured by using the vermiculite core for the vehicle.

FIGS. 10A-10D are exemplary diagrams illustrating a process of manufacturing an aluminum component for a vehicle using a vermiculite core according to various embodiments of the present invention. The process is performed by pressing the vermiculite core (see FIG. 10A), performing the insert casting process (see FIG. 10B), and performing a trimming process after forging (see FIG. 10C).

Figure 11:
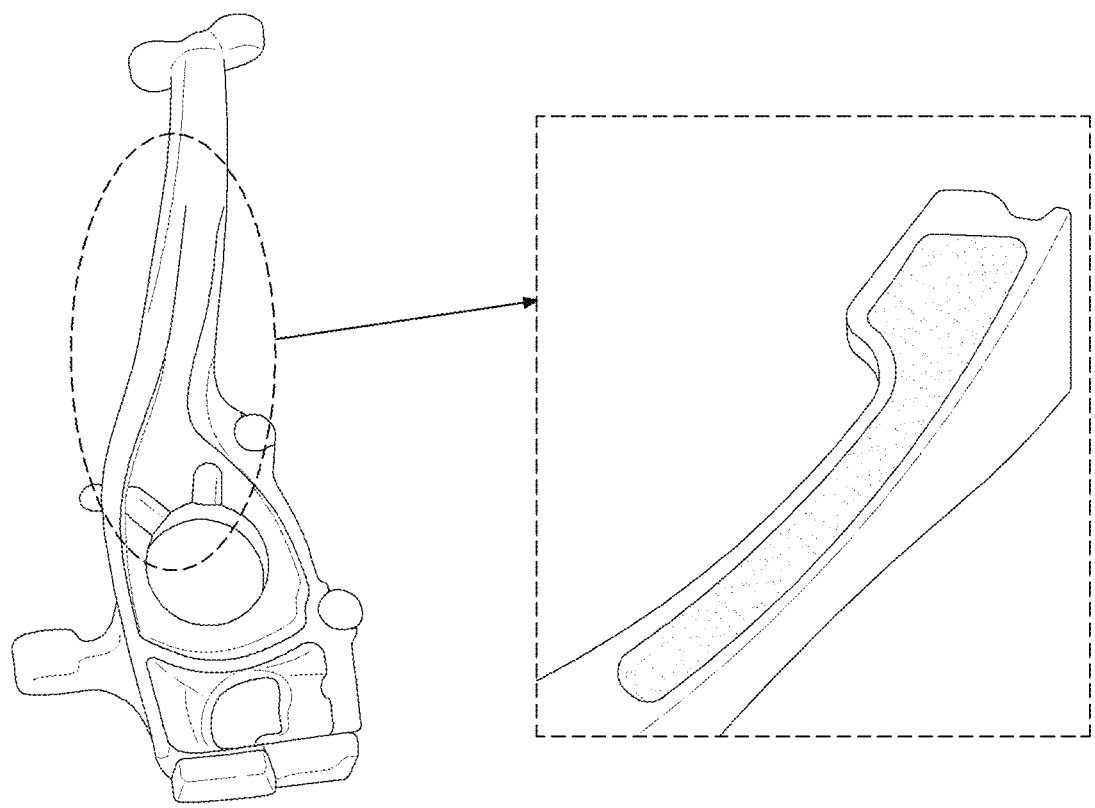
FIG. 11 is a photograph illustrating an aluminum component for a vehicle manufactured by using the vermiculite core according to various embodiments of the present invention.

FIG. 11 is a photograph illustrating an aluminum component for a vehicle manufactured by using the vermiculite core according to various embodiments of the present invention. As illustrated in FIG. 11, since the outlet is not present in the component, the deterioration of the fatigue strength is not generated.

Various embodiments of the present invention for solving the problems in the related art are directed to providing a method for manufacturing a vermiculite core for a vehicle including mixing foam vermiculite and pearlstone; injecting the mixture of the foam vermiculite and the pearlstone into a mold, and pressing the mixture by using a presser.

Figure 12A:
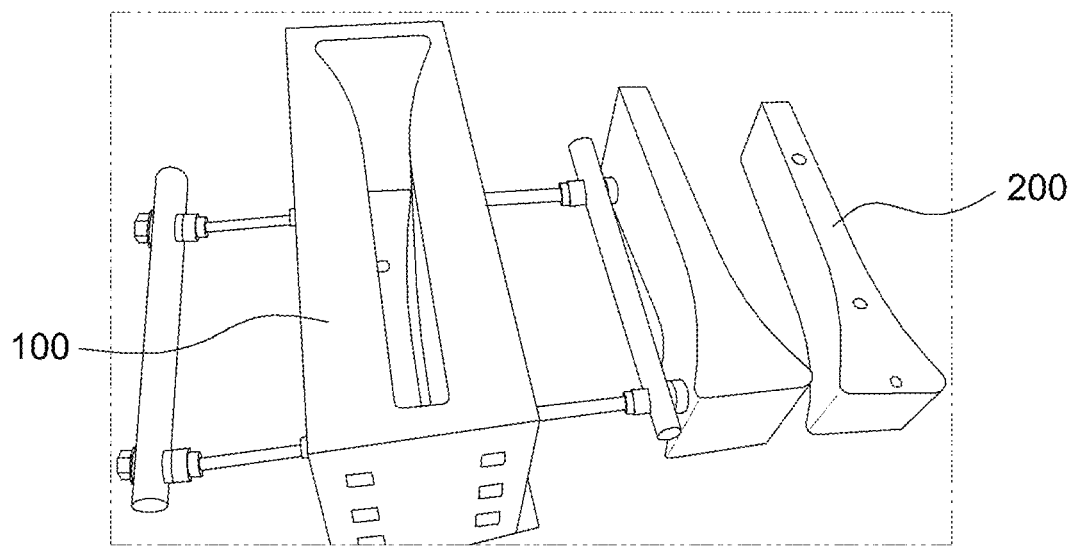
FIG. 12A and FIG. 12B are photographs illustrating a process of manufacturing a vermiculite core for a vehicle according to various embodiments of the present invention.
Figure 12B:
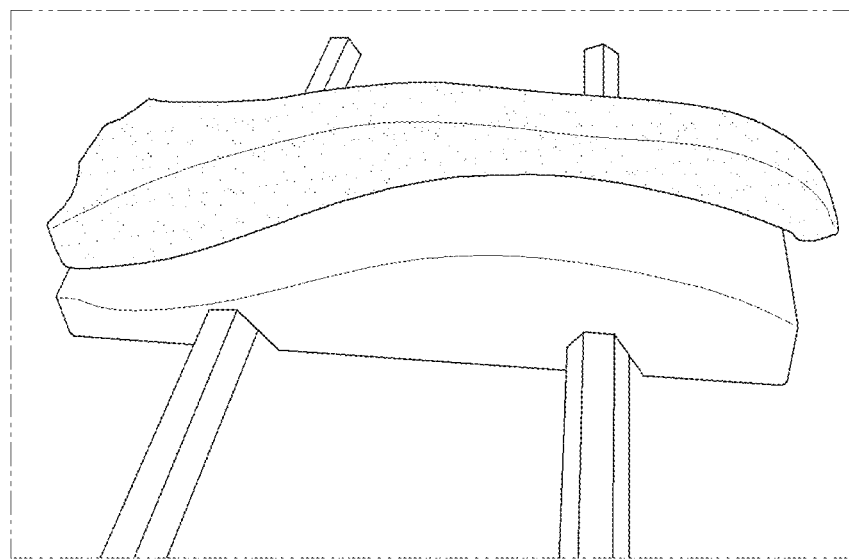

FIGS. 12A and 12B are photographs illustrating a process of manufacturing a vermiculite core for a vehicle according to various embodiments of the present invention. A vermiculite core for a vehicle having a shape illustrated in FIG. 12B may be manufactured by using an upper mold 200 and a lower mold 100 as illustrated in FIG. 12A.

In various embodiments of the present invention, in the injecting, the mixture may be divided and injected to form an aluminum bridge horizontally in a forging direction.

In various embodiments of the present invention, in the injecting, the mixture may be injected to insert a plurality of steel pins horizontally in a forging direction.

Figure 13A:
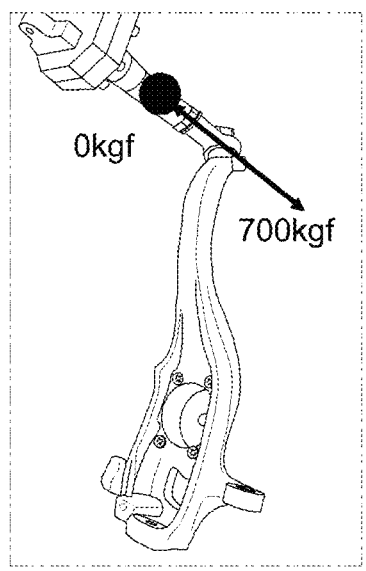
FIG. 13A, FIG. 13B, and FIG. 13C are photographs illustrating a pot hole durability test result of an aluminum component for a vehicle manufactured by using the vermiculite core according to various embodiments of the present invention.
Figure 13B:
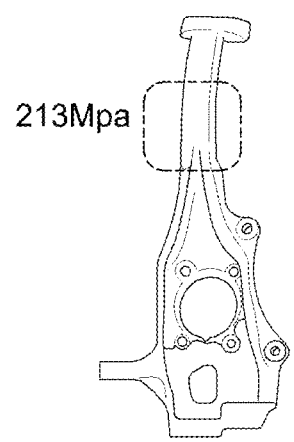
Figure 13C:
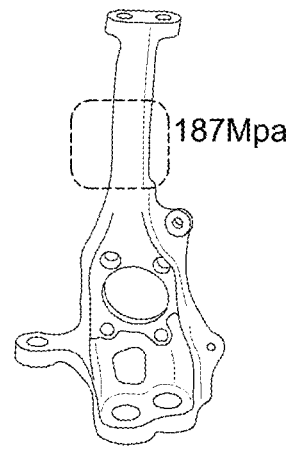

FIGS. 13A-13C is a photograph illustrating a pot hole durability test result of an aluminum component for a vehicle manufactured by using the vermiculite core for a vehicle according to various embodiments of the present invention. As illustrated in FIG. 13A, as a result evaluated in an environment of 700 kgf, in the case of applying a solid core as illustrated in FIG. 13B, the pot hole durability is 213 MPa, and in the case of applying a hollow core, the pot hole durability is 187 MPa. It can be seen that the core outlet is not presented by applying the vermiculite core, and thus the fatigue strength may be ensured.

Figure 14A:
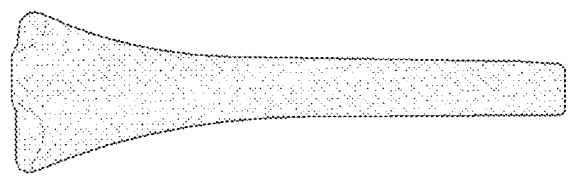
Figure 14B:
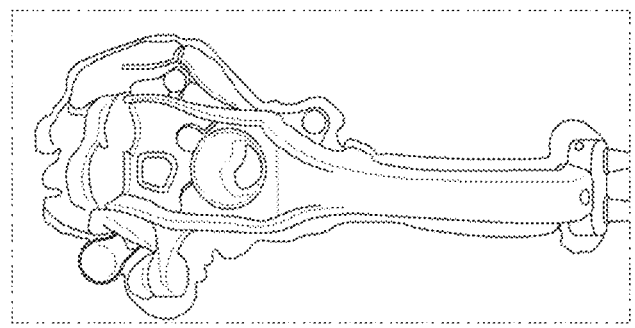
Figure 14C:
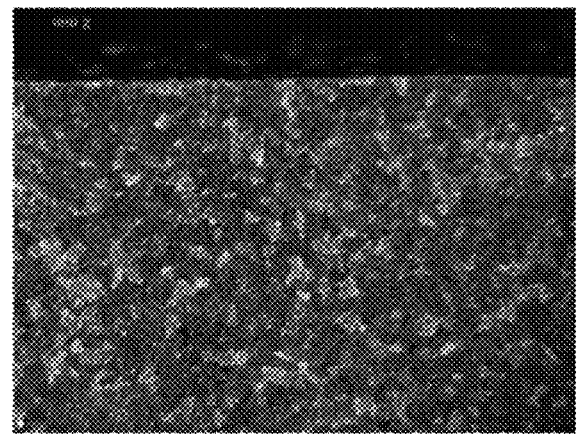

Meanwhile, FIGS. 14A-14C are photographs illustrating a forged flash length and a surface state of the aluminum component for the vehicle before applying the steel pin according to various embodiments of the present invention. As illustrated in FIG. 14A, in the case of manufacturing the component for the vehicle by using the vermiculite core without applying the steel pin, it can be seen that as illustrated in FIG. 14B, a forged flash of approximately 10 mm is formed and as illustrated in FIG. 14C, the surface state is exhibited.

FIGS. 15A-15C are photographs illustrating a forged flash length and a surface state of the aluminum component for the vehicle after applying the steel pin according to various embodiments of the present invention. As illustrated in FIG. 15A, in the case of manufacturing the component for the vehicle by using the vermiculite core with applying the steel pin, it can be seen that as illustrated in FIG. 15B, a forged flash of approximately 30 to 40 mm is formed and as illustrated in FIG. 15C, a surface microlayer of approximately 1 mm is formed.

The summary is listed in the following Table 1.

TABLE 1

| Classification | Before applying steel pin | After applying steel pin |
| --- | --- | --- |
| Forged flash length | 10 mm or less | 30 to 40 mm |
| Surface microstructure | Like core | Form surface microlayer of 1 mm |
| Reduction in weight | 8% | 7.8% |

As such, according to the vermiculite core for the vehicle, the aluminum component for the vehicle manufactured by using the same, and the method for manufacturing the vermiculite core for the vehicle, i) the weight is reduced to be similar to the hollow structure, ii) extraction of the core is not separately required to have a high design freedom, iii) there is no deterioration of fatigue strength caused by the outlet. Further, iv) the strength is ensured during forging and the forging rate is enhanced by applying the aluminum bridge or the steel pin to the vermiculite core, and v) the extraction of the core is not required and thus, processing cost may be reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vermiculite core for forging for a vehicle, the vermiculite core comprising vermiculite and pearlstone,
   wherein a content of the vermiculite ranges from 40 to 60% with respect to an entire volume of the vermiculite core for the vehicle,
   wherein the vermiculite core includes a plurality of specimens horizontally in a forging direction.

2. The vermiculite core for forging for the vehicle of claim 1, wherein a density of the vermiculite ranges from 0.1 to 0.25 g/cm$^3$.

3. The vermiculite core for forging for the vehicle of claim 1, wherein a density of the pearlstone ranges from 0.06 to 0.18 g/cm$^3$.

4. The vermiculite core for forging for the vehicle of claim 1, wherein the vermiculite core for forging for the vehicle is formed by pressing a mixture of the vermiculite and the pearlstone.

5. The vermiculite core for forging for the vehicle of claim 4, wherein a density of the pressed mixture ranges from 0.4 to 0.8 g/cm$^3$.

6. The vermiculite core for forging for the vehicle of claim 1, wherein the vermiculite core for forging for the vehicle has a plurality of holes horizontally in a forging direction to form an aluminum column.

7. The vermiculite core for forging for the vehicle of claim 1, wherein the vermiculite core for forging for the vehicle has a plurality of steel pins horizontally in a forging direction.

8. An aluminum component for a vehicle manufactured using a vermiculite core for the vehicle, the vermiculite core comprising vermiculite and pearlstone, wherein a content of the vermiculite ranges from 40 to 60% with respect to an entire volume of the vermiculite core for the vehicle, wherein the vermiculite core for forging for the vehicle has a plurality of steel pins horizontally in a forging direction.

9. A method for manufacturing a vermiculite core for a vehicle, the method comprising:
   mixing vermiculite and pearlstone;
   injecting a mixture of the vermiculite and the pearlstone into a mold, wherein the mixture is injected to insert a plurality of steel pins horizontally in a forging direction; and
   pressing the mixture using a presser;
   wherein a content of the vermiculite ranges from 40 to 60% with respect to an entire volume of the vermiculite core for the vehicle,
   wherein the vermiculite core for forging for the vehicle has a plurality of steel pins horizontally in a forging direction.

10. The vermiculite core for forging for the vehicle of claim 1, comprising a gap where an aluminum bridge is formed and is located in between two specimens and a longitudinal direction of the gap is horizontal to the forging direction.

11. A vermiculite core for forging for a vehicle, the vermiculite core comprising vermiculite and pearlstone,
  wherein a content of the vermiculite ranges from 40 to 60% with respect to an entire volume of the vermiculite core for the vehicle,
  wherein the vermiculite core for the vehicle has a plurality of holes horizontally in a forging direction where a plurality of aluminum bridges are formed.

12. The vermiculite core for forging for the vehicle of claim 11,
  wherein the vermiculite core for the vehicle has a plurality of holes horizontally drilled in a forging direction where an aluminum bridge is formed.

13. A vermiculite core for forging for a vehicle, the vermiculite core comprising vermiculite and pearlstone,
  wherein a content of the vermiculite ranges from 40 to 60% with respect to an entire volume of the vermiculite core for the vehicle,
  wherein the vermiculite core for forging for the vehicle has a plurality of steel pins horizontally in a forging direction.

\* \* \* \* \*